(12) United States Patent
Tsai

(10) Patent No.: US 12,496,979 B2
(45) Date of Patent: Dec. 16, 2025

(54) VEHICULAR ROOF RACK

(71) Applicant: JYIN SHENG CO., LTD., Changhua County (TW)

(72) Inventor: Yu-Lung Tsai, Changhua County (TW)

(73) Assignee: JYIN SHENG CO., LTD., Changhua County (TW)

( * ) Notice: Subject to any disclaimer, the term of this patent is extended or adjusted under 35 U.S.C. 154(b) by 196 days.

(21) Appl. No.: 18/348,218

(22) Filed: Jul. 6, 2023

(65) Prior Publication Data

US 2025/0010801 A1 Jan. 9, 2025

(51) Int. Cl.
*B60R 9/045* (2006.01)

(52) U.S. Cl.
CPC .................... *B60R 9/045* (2013.01)

(58) Field of Classification Search
CPC ................... B60R 9/045; B60R 9/04
USPC .......................................... 224/315
See application file for complete search history.

(56) References Cited

U.S. PATENT DOCUMENTS

| | | | | |
|---|---|---|---|---|
| 2,663,472 A | * | 12/1953 | Belgau ..................... | B60R 9/058 224/330 |
| 2,754,041 A | * | 7/1956 | Etienne ..................... | B60R 9/055 224/325 |
| 3,002,664 A | * | 10/1961 | Guevara ..................... | B60R 9/045 224/314 |
| 3,232,502 A | * | 2/1966 | Kleinbortas ..................... | B60R 9/045 224/314 |
| 4,632,289 A | * | 12/1986 | Morissette ..................... | B60R 9/045 224/314 |
| 7,798,381 B2 | * | 9/2010 | Moreau ..................... | B60R 9/045 224/314 |
| 11,603,047 B2 | | 3/2023 | Yang | |
| 11,752,945 B2 | * | 9/2023 | Tertuliani ..................... | B60R 9/04 224/315 |
| 12,090,965 B2 | * | 9/2024 | Yang ..................... | B60R 9/055 |
| 2004/0195866 A1 | * | 10/2004 | Fin ..................... | B60R 9/045 296/210 |

FOREIGN PATENT DOCUMENTS

TW I656052 4/2019

* cited by examiner

*Primary Examiner* — Peter N Helvey
(74) *Attorney, Agent, or Firm* — MUNCY, GEISSLER, OLDS & LOWE, P.C.

(57) ABSTRACT

A vehicular roof rack includes: a holder having two lateral portions opposing each other; two U-shaped frames each having a transverse rod and two arm rods connected to two ends of the transverse rod, respectively; and two retractable rods each having two ends pivotally connected to the arm rods of the U-shaped frames, respectively. An angle positioning device is disposed between one of the arm rods of each U-shaped frame and one of the lateral portions of the holder to fasten the U-shaped frames at variable angles as needed.

7 Claims, 8 Drawing Sheets

VEHICULAR ROOF RACK

BACKGROUND OF THE INVENTION

1. Technical Field

The present disclosure relates to vehicular roof racks, and more particularly to a vehicular roof rack with U-shaped frames adjustable to be fixed at multiple angles.

2. Description of Related Art

Regarding the prior art of vehicular roof racks, for example, U.S. Pat. No. 11,603,047 B2 (with its related Taiwan patent 1656052) discloses a vehicular roof panel including a base panel and two barrier rods. The two barrier rods stand obliquely or lie flat relative to the base panel. When any one of the barrier rods stands, it must be fixed to the base panel, using two positioning-fastening plates.

The aforesaid prior art involves using the positioning-fastening plates to fix two barrier rods to a base panel at a fixed angle. Although the aforesaid prior art is effective in fixing the two barrier rods in place at an angle, the fixing effect is subjected to a limitation imposed by the positioning-fastening plates; as a result, the two barrier rods can only stand obliquely at two angles or lie flat but cannot be fixed in place at multiple different angles desired by users.

BRIEF SUMMARY OF THE INVENTION

It is an objective of the disclosure to provide a vehicular roof rack with U-shaped frames adjustable to be fixed at two or more different angles as determined by a user as needed.

To achieve the above and other objectives, the disclosure provides a vehicular roof rack comprising: a holder having two lateral portions opposing each other; two U-shaped frames each having a transverse rod and two arm rods connected to two ends of the transverse rod, respectively, wherein the two arm rods of each of the U-shaped frames are pivotally connected to the two lateral portions of the holder, respectively, to allow the transverse rods of the U-shaped frames to span the holder; and two retractable rods being operable to change length thereof and flanking the holder, wherein two ends of each of the retractable rods are pivotally connected to the arm rods of the U-shaped frames, respectively, wherein an angle positioning device is disposed between one of the arm rods of each U-shaped frame and one of the lateral portions of the holder, the angle positioning devices each having a fastening component and a locking component, wherein one of the fastening components is fixedly disposed at one of the lateral portions of the holder, the fastening components each having a plurality of receiving portions, wherein the locking components are disposed at the arm rods and move in response to rotation of the arm rods, the locking components each having at least one interference portion operable to move toward or away from the fastening component, wherein the at least one interference portion interferes with at least one of the plurality of receiving portions of the fastening component to prevent the fastening component from rotating relative to the locking component when the locking component gets closer to the fastening component, wherein, when the locking component moves away from the fastening component, the at least one interference portion does not interfere with at least one of the plurality of receiving portions of the fastening component, allowing the fastening component to rotate relative to the locking component.

Therefore, the U-shaped frames of the vehicular roof rack of the disclosure can be fixed at two or more different angles desired by a user. Furthermore, the vehicular roof rack of the disclosure can be inverted to function as a table.

DETAILED DESCRIPTION OF THE INVENTION

Figure 1:
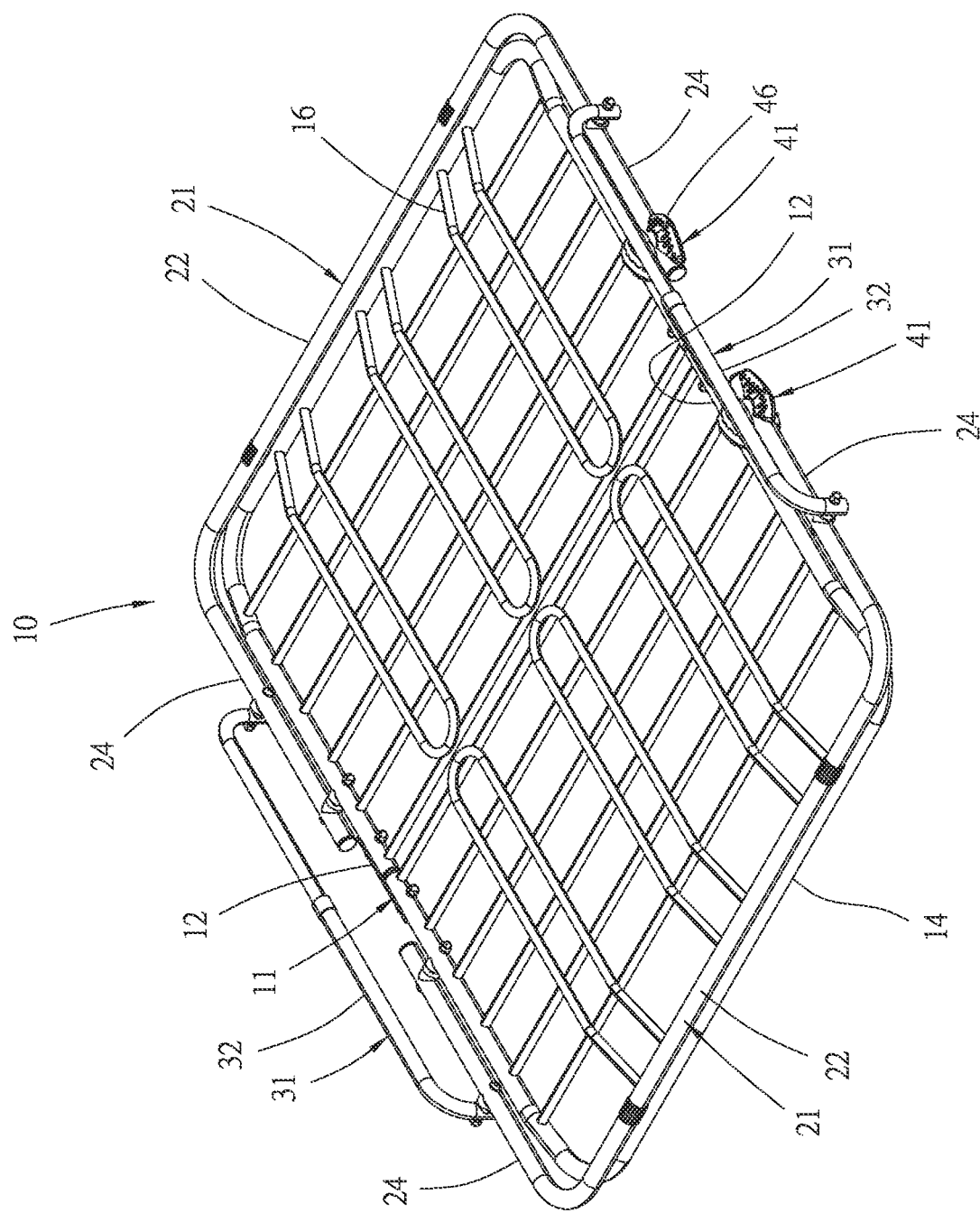
FIG. 1 is a perspective view of a vehicular roof rack according to the first preferred embodiment of the disclosure.
Figure 2:
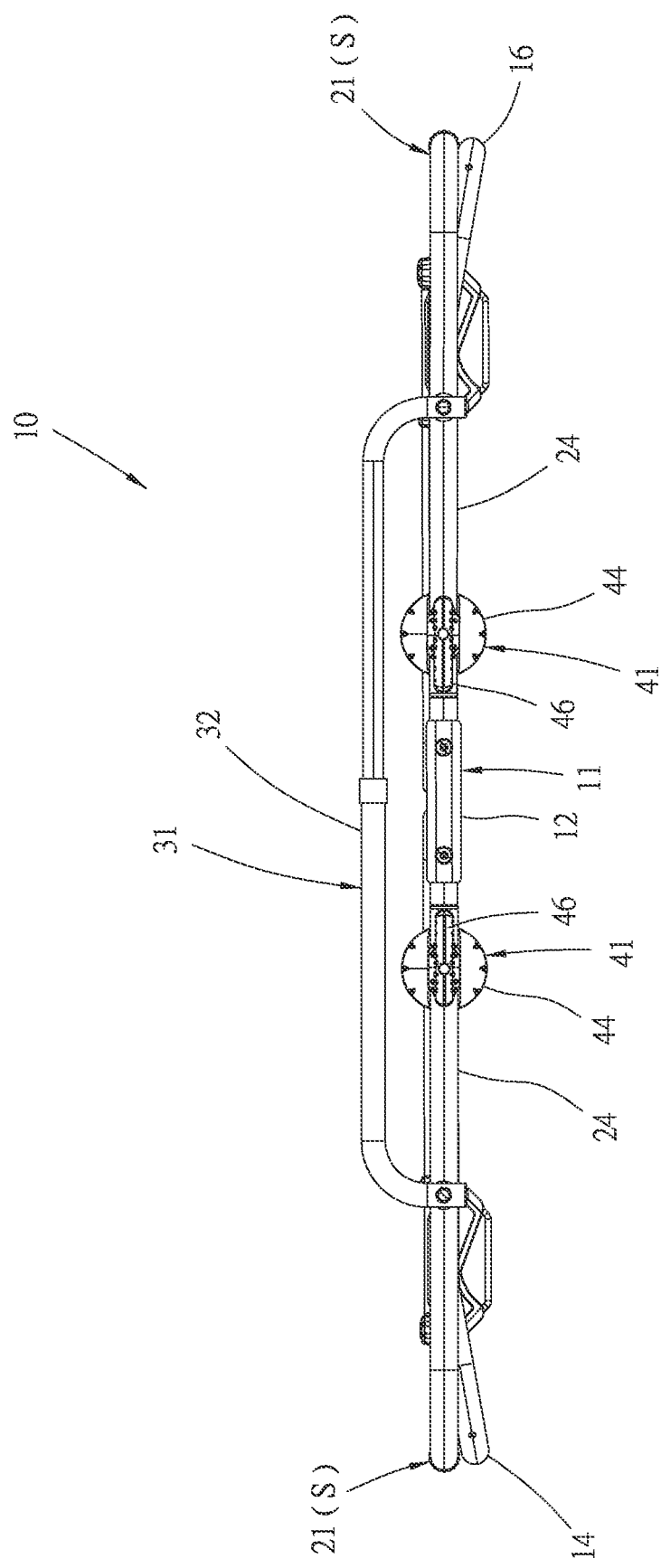
FIG. 2 is a side view of the vehicular roof rack according to the first preferred embodiment of the disclosure.

The technical features of the disclosure are hereunder illustrated with preferred embodiments, depicted with accompanying drawings, and described below.

As shown in FIG. 1 through FIG. 5, the first preferred embodiment of the disclosure provides a vehicular roof rack 10 essentially comprising a holder 11, two U-shaped frames 21 and two retractable rods 31.

The holder 11 has two lateral portions 12 opposing each other. In the first embodiment, the holder 11 has a plurality of rods that cross each other to form a flat netlike structure. The lateral portions 12 are each a rod. Furthermore, the holder 11 is completely flat. In the first embodiment, the holder 11 is substantially flat and has a front portion 14 and a rear portion 16. The front portion 14 extends forward and downward and thus tilts to define a space S above. The rear portion 16 extends backward and downward and thus tilts to define a space S above.

The U-shaped frames 21 each have a transverse rod 22 and two arm rods 24 connected to two ends of the transverse rod 22, respectively. The two arm rods 24 of each of the U-shaped frames 21 are pivotally connected to the two lateral portions 12 of the holder 11, respectively, to allow the transverse rods 22 of the U-shaped frames 21 to span the holder 11. The two arm rods 24 of each of the U-shaped frames 21 are outside the two lateral portions 12 of the holder 11. When the two arm rods 24 of each of the two U-shaped frames 21 lie transversely or horizontally, the transverse rods 22 of the two U-shaped frames 21 are positioned in the space S above the front portion 14 and the space S above the rear portion 16, respectively.

The two retractable rods 31 are operable to change their length. The two ends of each of the retractable rods 31 are pivotally connected to the arm rods 24 of the U-shaped frames 21, respectively, and the two retractable rods 31 flank the holder 11. The retractable rods 31 each have a rod body 32 with two ends that curve downward and extend to be pivotally connected to the arm rods 24 of the corresponding one of the U-shaped frames 21, respectively. When the arm rods 24 of the U-shaped frames 21 lie transversely, the rod bodies 32 of the retractable rods 31 are higher than the arm rods 24.

An angle positioning device 41 is disposed between one of the arm rods 24 of each U-shaped frame 21 and one of the lateral portions 12 of the holder 11. The angle positioning devices 41 each have a fastening component 42 and a locking component 44. In the first embodiment, the fastening component 42 and the locking component 44 are each a gear and thus have a plurality of teeth spaced apart from each other. The spaces between the plurality of teeth of the fastening component 42 form a plurality of receiving portions 421. The plurality of teeth of the locking component 44 function as a plurality of interference portions 441. The fastening component 42 and the locking component 44 face each other through their plurality of teeth. The fastening component 42 is fixedly disposed at one of the lateral portions 12 of the holder 11. The locking component 44 is movably disposed at one of the arm rods 24 and thus moves in response to the swing of the arm rods 24. The locking component 44 is operable to move toward or away from the fastening component 42. When the locking component 44 gets closer to the fastening component 42, the plurality of interference portions 441 interfere with the plurality of receiving portions 421 of the fastening component 42 to prevent the fastening component 42 from rotating relative to the locking component 44. When the locking component 44 moves away from the fastening component 42, the plurality of interference portions 441 do not interfere with the plurality of receiving portions 421 of the fastening component 42, allowing the fastening component 42 to rotate relative to the locking component 44.

In practice, in the first embodiment, a clutching component 46 is rotatably disposed on the arm rod 24. The clutching component 46 has an axle 461 penetrating the arm rod 24, the locking component 44 and the fastening component 42 and thus is disposed at the lateral portions 12. The clutching component 46 has grooves 462 that vary in depth at different angles. The clutching component 46 is rotatable to allow the grooves 462 of different depths to abut against the arm rod 24 to cause the arm rod 24 to press against or move away from the fastening component 42, driving the locking component 44 to press against or move away from the fastening component 42. Owing to the structural resilience of the U-shaped frames 21, the two arm rods 24 pivotally disposed at the two lateral portions 12 are capable of resetting after continuously moving outward, and thus the two arm rods 24 can exert an outward restoring force after being restrained by the clutching components 46.

The structural features of the vehicular roof rack in the first embodiment are explained above. The use of the vehicular roof rack in the first embodiment is described below.

Figure 6:
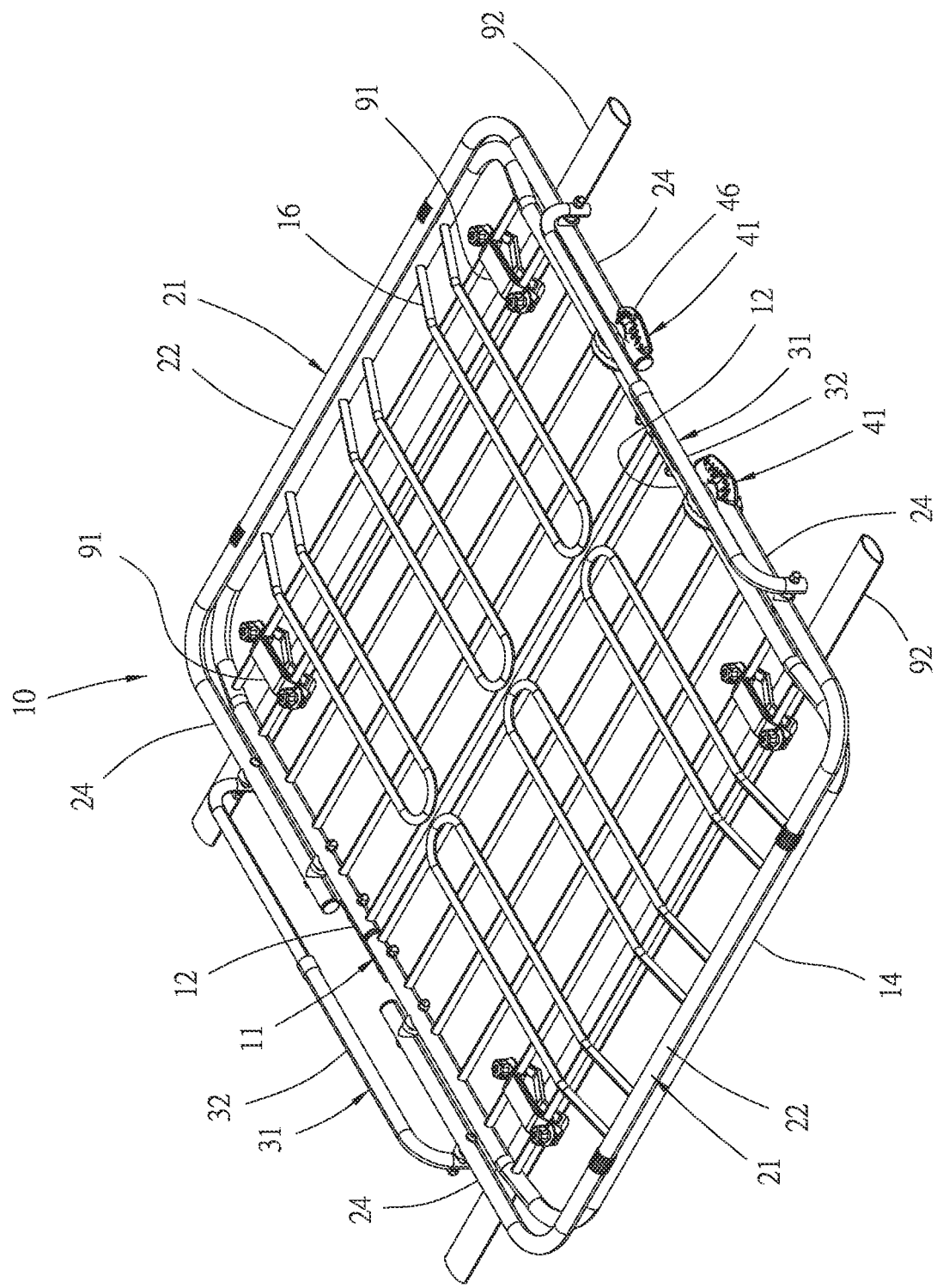
FIG. 6 is a perspective view of an installation state of the vehicular roof rack according to the first preferred embodiment of the disclosure.

As shown in FIG. 6, a plurality of clamps 91 are mounted and clamped on two installation rods 92, and then the two installation rods 92 are mounted on a roof rack of a car. FIG. 6 shows the plurality of clamps 91 and the two installation rods 92 but not the car and the roof rack thereon, because the latter is deemed conventional, common knowledge.

As shown in FIG. 1, when the two U-shaped frames 21 lie horizontally, the transverse rods 22 of the two U-shaped frames 21 are disposed in the spaces S above the front portion 14 and the rear portion 16, respectively, and the clutching components 46 of the angle positioning devices 41 are parallel to the arm rods 24 to cause the arm rods 24 to press against the lateral portions 12. This causes the locking components 44 to press against the fastening components 42 to form a locking mechanism, allowing the two U-shaped frames 21 to be fixed in place transversely.

Figure 3:
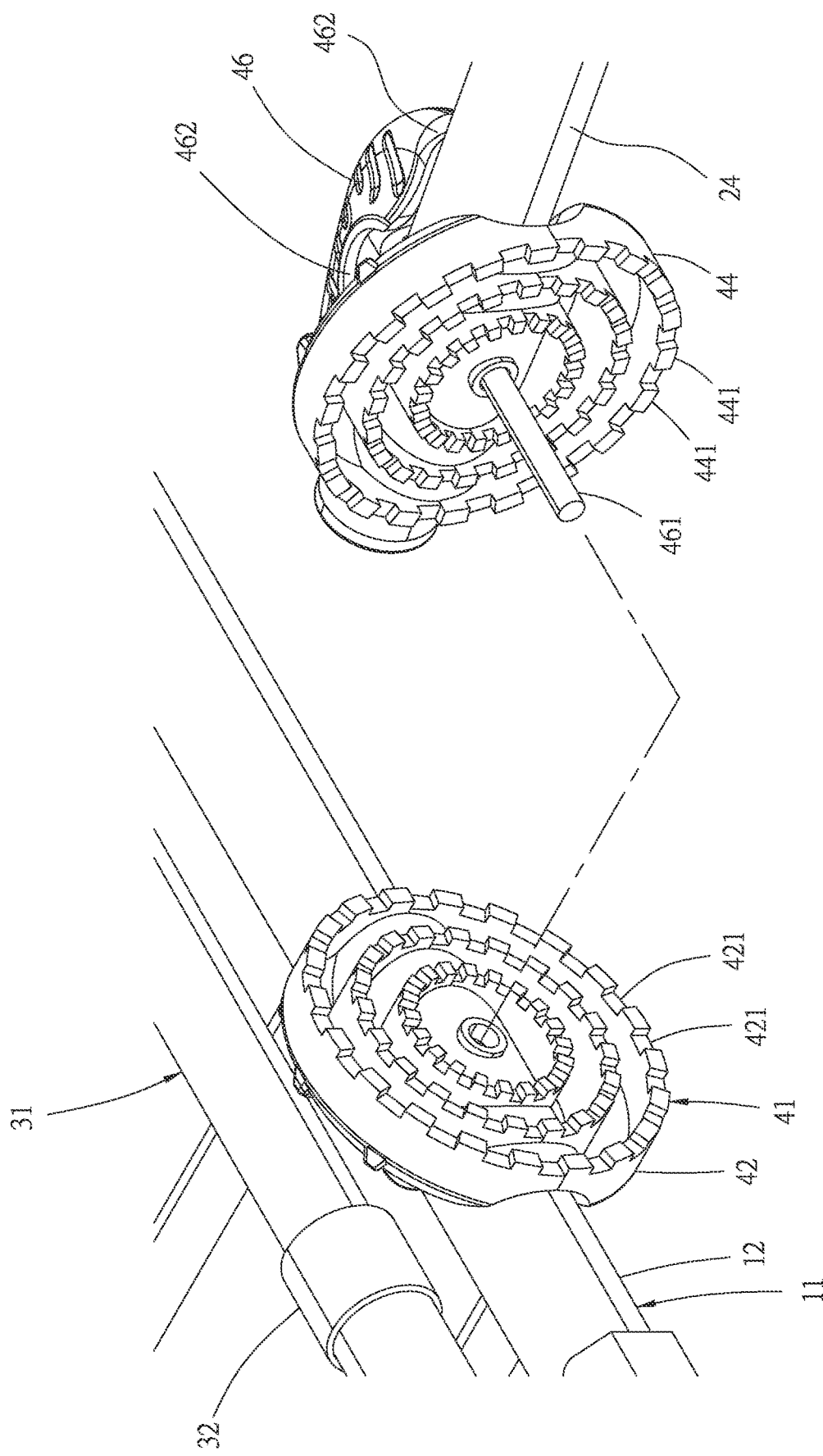
FIG. 3 is an exploded view of some of the components of the vehicular roof rack according to the first preferred embodiment of the disclosure.
Figure 4:
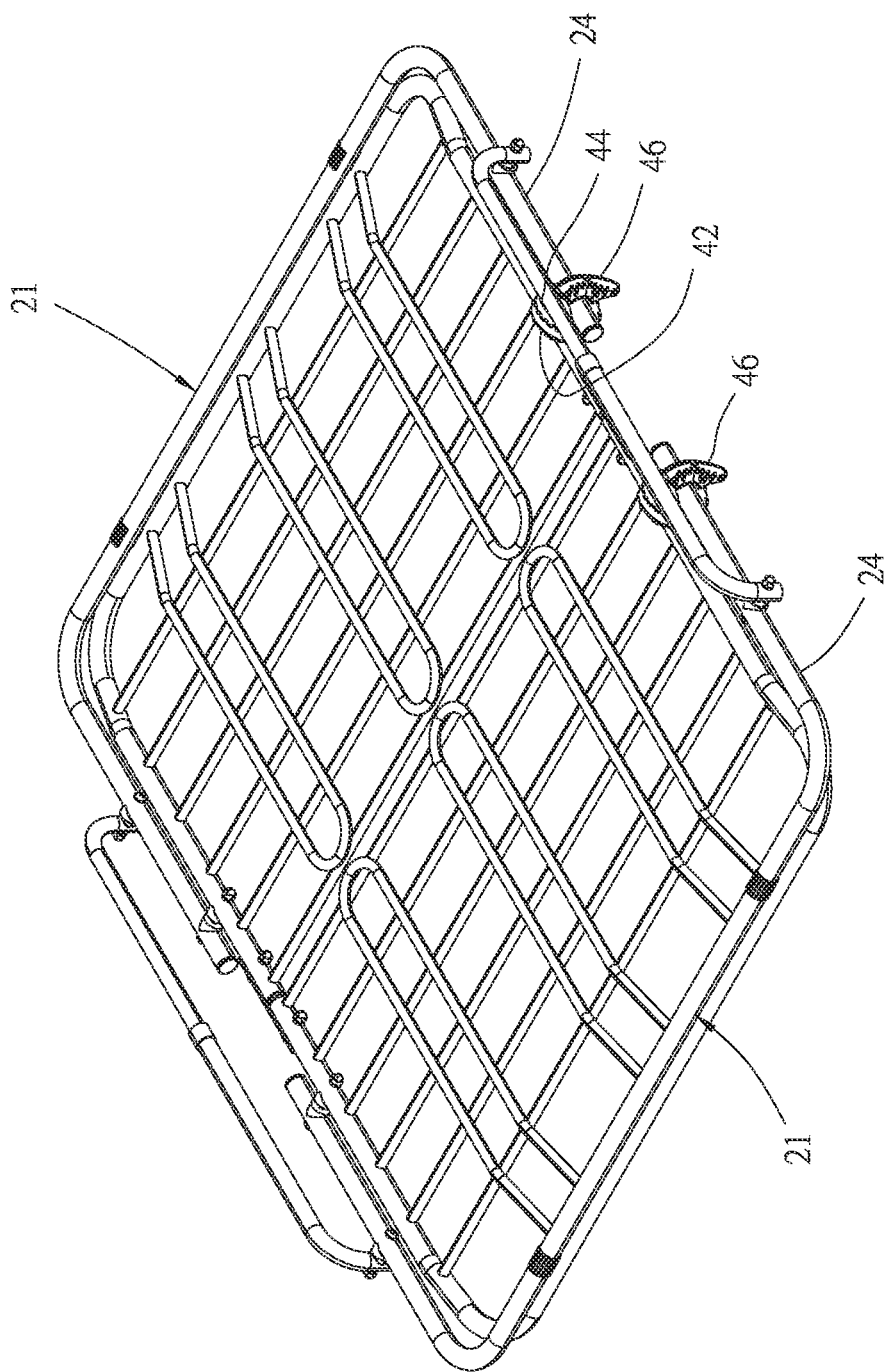
FIG. 4 is a perspective view of an operating state of the vehicular roof rack according to the first preferred embodiment of the disclosure.

As shown in FIG. 4 in conjunction with FIG. 3, to change the angles of the two U-shaped frames 21, a user only has to rotate the clutching components 46 until the clutching components 46 become perpendicular to the arm rods 24 such that the arm rods 24 move outward because of the structural resilience of the U-shaped frames 21 to drive the locking components 44 moving away from the fastening components 42 to disable the locking mechanism, allowing the user to operate the two U-shaped frames 21 to allow the two U-shaped frames 21 to be rotated to their required positions.

Figure 5:
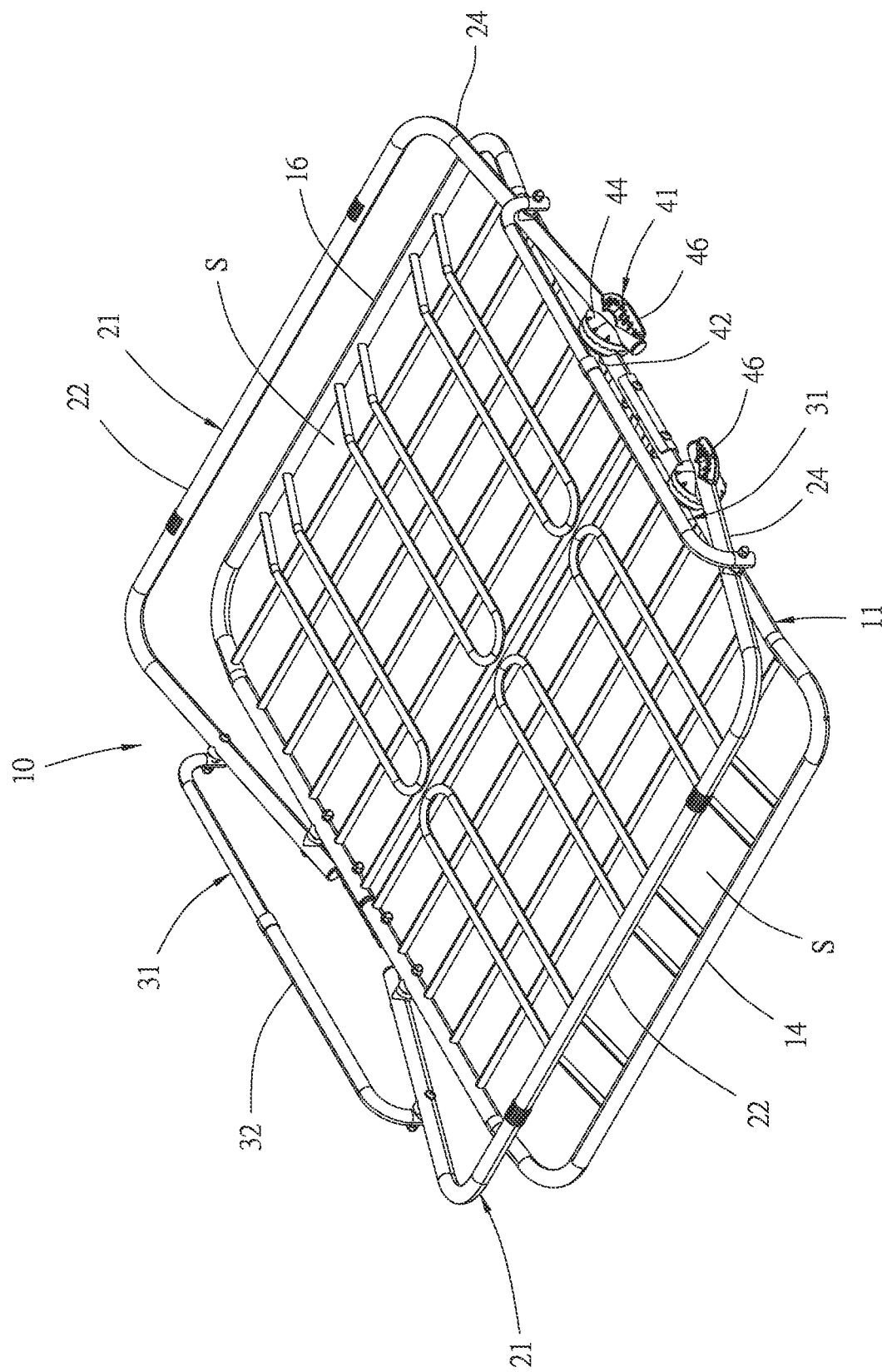
FIG. 5 is a perspective view of another operating state of the vehicular roof rack according to the first preferred embodiment of the disclosure.

As shown in FIG. 5, after the two U-shaped frames 21 have been rotated to their required positions, the user only has to rotate the clutching components 46 until the clutching components 46 become parallel to the arm rods 24, and thus the locking components 44 press against the fastening components 42 to form the locking mechanism again, fixing the two U-shaped frames 21 at the angle. At this point in time, the transverse rods 22 of the two U-shaped frames 21 and the two retractable rods 31 together function as peripheral barriers that collectively define a basket-shape or box-shaped structure, allowing the user to easily put articles in the basket-shape or box-shaped structure and then fasten thereto the articles with a rope or any other fasteners.

Figure 7:
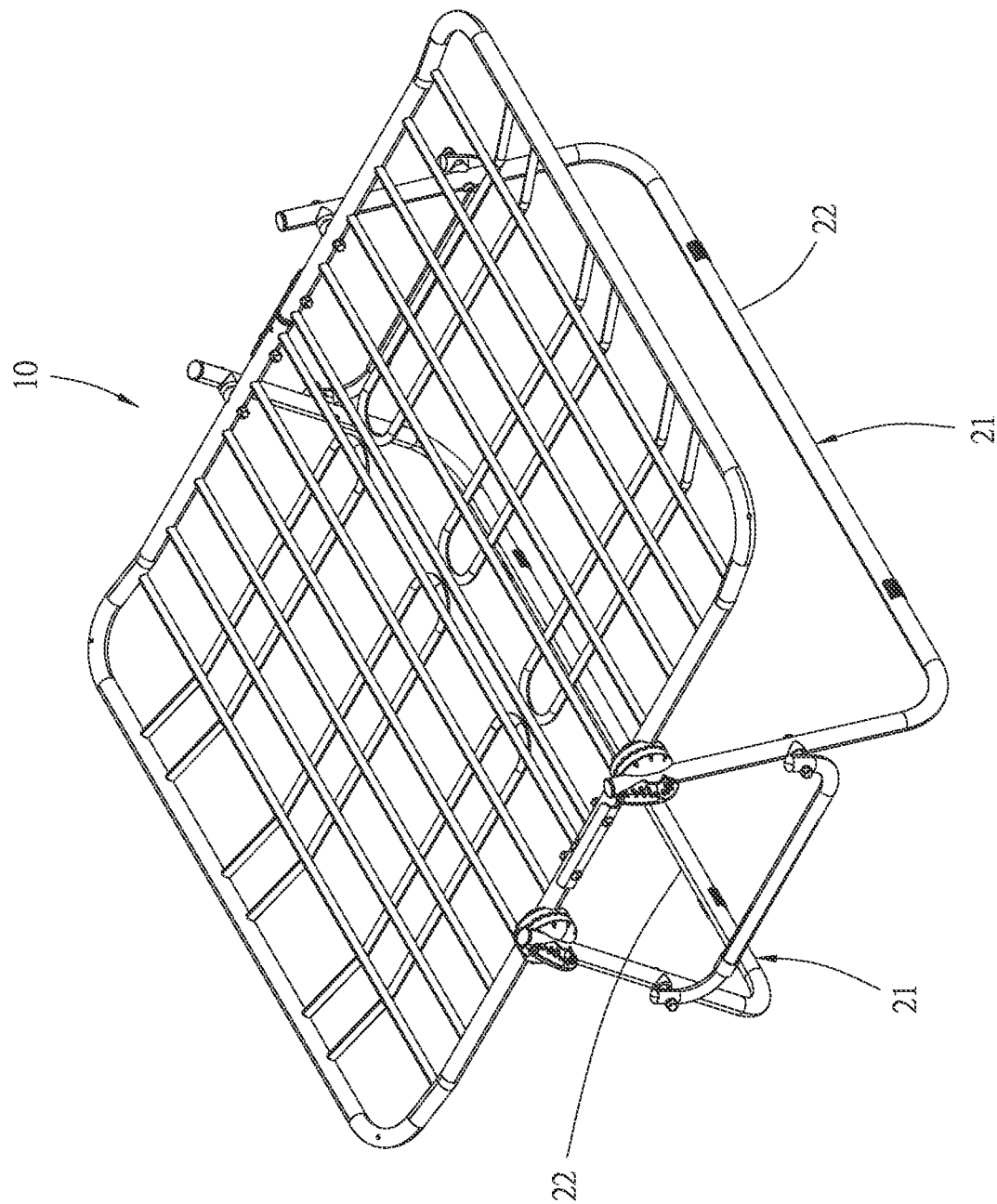
FIG. 7 is a perspective view of a usage state of the vehicular roof rack according to the first preferred embodiment of the disclosure.

As shown in FIG. 7, when the two U-shaped frames 21 are rotated to the maximum angle and fastened in place, the vehicular roof rack 10 is inverted to allow the transverse rods 22 of the two U-shaped frames 21 to rest on the ground. Thus, the holder 11 can function as a table for use in outdoor activities, such as camping.

As indicated above, according to the disclosure, the U-shaped frames 21 are adjustable to be fixed at two or more different angles desired by the user and thus exhibit broad applicability. Furthermore, unlike conventional vehicular roof racks, the holder 11 of the vehicular roof rack of the disclosure can function as a table for use in outdoor activities, such as camping.

Figure 8:
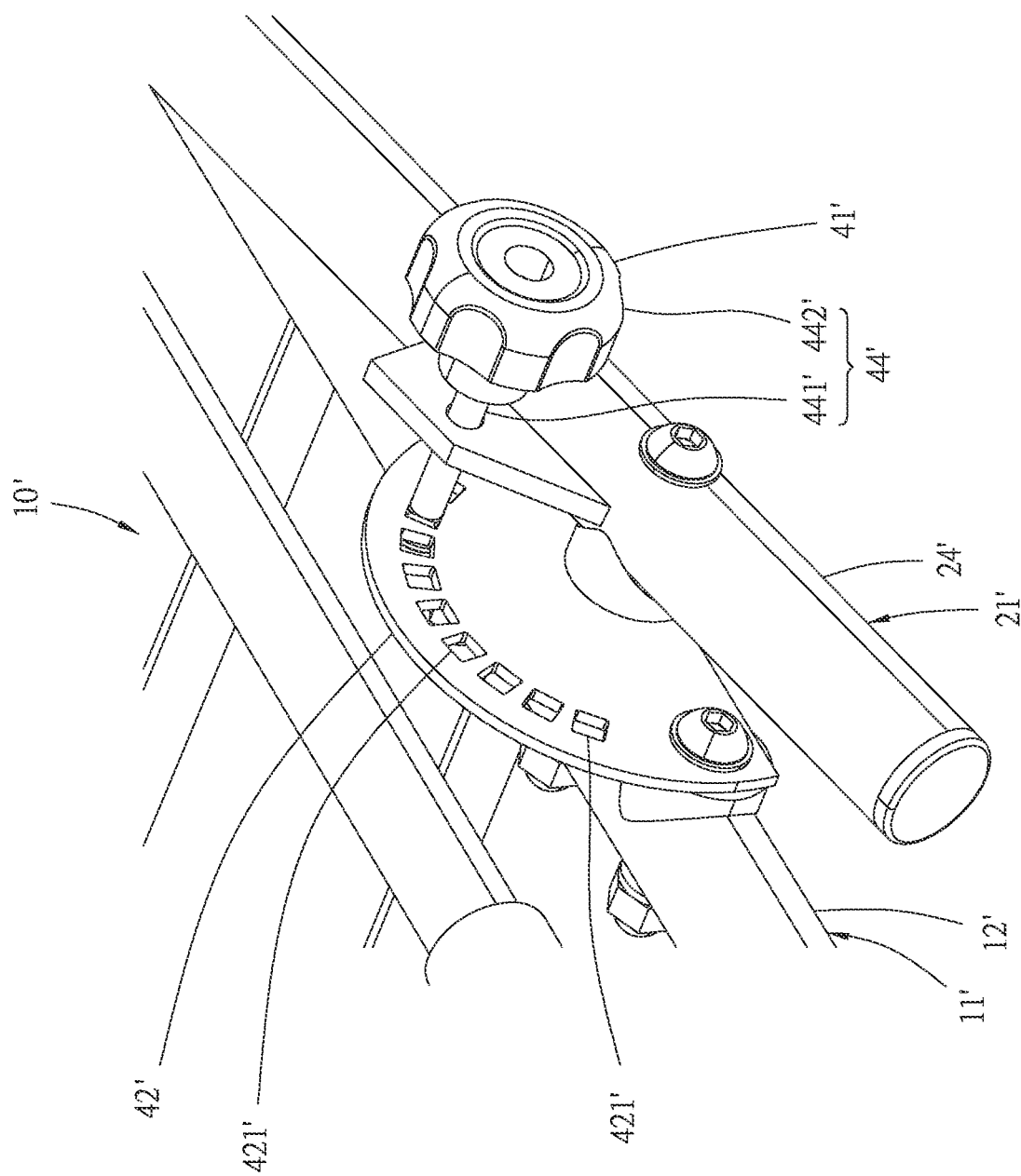
FIG. 8 is a perspective view of part of the vehicular roof rack according to the second preferred embodiment of the disclosure.

As shown in FIG. 8, the second preferred embodiment of the disclosure provides a vehicular roof rack 10' distinguished from the vehicular roof rack 10 of the first embodiment of the disclosure by the technical features described below.

The fastening components 42' of the angle positioning devices 41' are plate-shaped and each have a plurality of holes to function as the plurality of receiving portions 421' located at different positions, respectively. The locking components 44' of the angle positioning devices 41' each have a bolt and a knob 442' disposed at one end of the bolt. The bolts function as the interference portions 441' for penetrating the arm rods 24' and thus being operated in accordance with the positions of the arm rods 24' so as to be engaged with or disengaged from the receiving portions 421', respectively.

The fastening components 42' are fixedly disposed at the lateral portions 12' of the holder 11', respectively, and thus cannot be rotated. After being moved in response to the rotation of the arm rods 24', the locking components 44' are engaged with the receiving portions 421' because of the interference portions 441' to fasten the arm rods 24' to the position. The two U-shaped frames 21' can be fixed at angles desired by the user, and the number of the angles is greater than that (i.e., two angles for use and lying, respectively) of the prior art.

The other structural features and achievable advantages of the second embodiment are substantially identical to those of the first embodiment and thus are, for the sake of brevity, not reiterated.

The above description of the disclosure is illustrated by preferred embodiments rather than restrictive of the claims of the disclosure. All simple changes made to the disclosure or equivalent embodiments carried out for the disclosure according to the claims and specification of the disclosure shall be deemed falling within the scope of the claims of the disclosure.

What is claimed is:

1. A vehicular roof rack, comprising:
a holder having two lateral portions opposing each other;
two U-shaped frames each having a transverse rod and two arm rods connected to two ends of the transverse rod, respectively, wherein the two arm rods of each of the U-shaped frames are pivotally connected to the two lateral portions of the holder, respectively, to allow the transverse rods of the U-shaped frames to span the holder; and
two retractable rods being operable to change length thereof and flanking the holder, wherein two ends of each of the retractable rods are pivotally connected to the arm rods of the U-shaped frames, respectively,
wherein an angle positioning device is disposed between one of the arm rods of each U-shaped frame and one of the lateral portions of the holder, the angle positioning devices each having a fastening component and a locking component, wherein one of the fastening components is fixedly disposed at one of the lateral portions of the holder, the fastening components each having a plurality of receiving portions, wherein the locking components are disposed at the arm rods and move in response to rotation of the arm rods, the locking components each having at least one interference portion operable to move toward or away from the fastening component, wherein the at least one interference portion interferes with at least one of the plurality of receiving portions of the fastening component to prevent the fastening component from rotating relative to the locking component when the locking component gets closer to the fastening component, wherein, when the locking component moves away from the fastening component, the at least one interference portion does not interfere with at least one of the plurality of receiving portions of the fastening component, allowing the fastening component to rotate relative to the locking component.

2. The vehicular roof rack of claim 1, wherein the lateral portions of the holder are each a rod, and the two arm rods of each of the U-shaped frames are outside the two lateral portions of the holder.

3. The vehicular roof rack of claim 1, wherein the holder has a front portion and a rear portion, the front portion extending forward and downward and thus tilts to define a space above, the rear portion extending backward and downward and thus tilts to define a space above, wherein the two arm rods of each of the two U-shaped frames lie transversely when the transverse rods of the two U-shaped frames are positioned in the space above the front portion and the space above the rear portion, respectively.

4. The vehicular roof rack of claim 3, wherein the retractable rods each have a rod body with two ends that curve downward and extend to be pivotally connected to the arm rods of the corresponding one of the U-shaped frames, respectively, wherein the rod bodies of the retractable rods are higher than the arm rods when the arm rods of the U-shaped frames lie transversely.

5. The vehicular roof rack of claim 3, wherein the holder 11 has a plurality of rods that cross each other to form a flat netlike structure, wherein both the front portion and the rear portion are flat.

6. The vehicular roof rack of claim 1, wherein the fastening component and the locking component of each of the angle positioning devices are each a gear and thus have a plurality of teeth spaced apart from each other, the spaces between the plurality of teeth of the fastening component form a plurality of receiving portions, and the plurality of teeth of the locking component function as the plurality of interference portions, allowing the fastening component and the locking component to face each other through the plurality of teeth.

7. The vehicular roof rack of claim 1, wherein the fastening components of the angle positioning devices are plate-shaped and each have a plurality of holes to function as the plurality of receiving portions located at different positions, respectively, wherein the locking components of the angle positioning devices each have a bolt and a knob disposed at an end of the bolt, wherein the bolts function as the interference portions for penetrating the arm rods and thus being operated in accordance with the positions of the arm rods so as to be engaged with or disengaged from the receiving portions, respectively.

* * * * *